United States Patent [19]

Sankaran

[11] Patent Number: 5,012,025
[45] Date of Patent: Apr. 30, 1991

[54] MOLECULAR RESTRUCTURING CATALYST

[76] Inventor: Viswanatha Sankaran, 6A D'Silva Rd., Madras 600004, India

[21] Appl. No.: 397,775

[22] Filed: Aug. 23, 1989

[51] Int. Cl.$^5$ .............................. C07C 2/20; C07C 2/22
[52] U.S. Cl. .................................... 585/415; 585/418; 585/442; 585/520; 585/530; 585/653; 585/669; 502/224; 502/231
[58] Field of Search ............... 585/407, 400, 415, 416, 585/669, 442, 653, 240, 613, 520, 530, 418; 258/113, 46

[56] References Cited

U.S. PATENT DOCUMENTS

| | | | |
|---|---|---|---|
| 1,656,813 | 1/1928 | Bird | 585/416 |
| 2,245,735 | 6/1941 | Subkow | 585/530 |
| 2,385,609 | 9/1945 | Clark et al. | 585/530 |
| 2,531,294 | 11/1950 | Pickell | 502/231 |
| 2,559,984 | 7/1951 | Montgomery et al. | 585/520 |
| 2,803,684 | 8/1957 | Frey et al. | 585/415 |
| 2,849,428 | 8/1958 | Small et al. | 585/520 |
| 3,387,052 | 6/1968 | Addison | 585/415 |
| 3,475,347 | 10/1969 | Johnson | 585/520 |
| 3,649,698 | 3/1972 | Schmerling | 502/231 |
| 3,848,016 | 11/1974 | Hisashikono et al. | 585/653 |
| 3,947,509 | 3/1976 | Isa et al. | 585/520 |
| 3,985,822 | 10/1976 | Watson | 585/520 |
| 4,066,716 | 1/1978 | Herbstman et al. | 502/231 |
| 4,148,837 | 4/1979 | Benson, Jr. | 502/231 |
| 4,377,491 | 3/1983 | Canavesi et al. | 502/231 |
| 4,414,136 | 11/1983 | Convers | 570/243 |
| 4,495,374 | 1/1985 | Jones et al. | 585/500 |
| 4,504,597 | 3/1985 | Klar et al. | 556/476 |
| 4,523,049 | 6/1985 | Jones et al. | 585/500 |
| 4,547,608 | 10/1985 | Johnson | 585/500 |
| 4,567,307 | 1/1986 | Jones et al. | 585/330 |
| 4,762,958 | 8/1988 | Martens et al. | 585/613 |

FOREIGN PATENT DOCUMENTS

| | | | |
|---|---|---|---|
| 3095108 | 4/1988 | Japan | 502/231 |
| 0677160 | 11/1986 | U.S.S.R. | 502/231 |

OTHER PUBLICATIONS

Chem. Abstract 95(26):222498u.

Primary Examiner—Anthony McFarlane
Attorney, Agent, or Firm—D. Peter Hochberg; Mark Kusner; Louis J. Weisz

[57] ABSTRACT

A catalyst for promoting the molecular restructuring of the components of hydrocarbons to form desired products. The catalyst comprises copper salts, copper acetate being particularly preferred, in combination with anhydrous aluminum chloride. The catalyst can be used with either gaseous hydrocarbon raw materials such as natural gas, refinery gas, biomass decomposition gases, and similar materials, or with solids, meltable solids, or liquid hydrocarbon-containing raw materials including tar sands, oil shale, waxes, asphaltic compositions and the like. In the case of gaseous raw materials, the gases are preferably brought into contact with the copper salt coated on a catalyst support such as refractory alumina, in the presence of anhydrous aluminum chloride, which can be in vaporous form, in a continuous process. When liquids, solids, or meltable solids are treated, the catalyst is added to the reaction vessel containing such raw materials and heated until the products formed are vaporized and driven from the vessel. The products formed are water scrubbed and rectified. A variety of products are thus obtained including materials such as gasoline, kerosene, diesel, light lubes, and others.

10 Claims, No Drawings

MOLECULAR RESTRUCTURING CATALYST

TECHNICAL FIELD

This invention relates to catalysts effective in promoting the molecular restructuring of hydrocarbons. More particularly, this invention relates to catalysts that promote the dehydrogenation of hydrocarbon compounds and their subsequent recombination into desired chemical structures. Specifically, this invention relates to the use of catalysts comprising copper salts, employed in conjunction with anhydrous aluminum chloride for combining hydrocarbon molecules to form various other hydrocarbon molecules, or for facilitating the cracking of hydrocarbon molecules to form more desirable materials.

BACKGROUND OF THE INVENTION

Hydrocarbons are among the most versatile substances available to mankind, being suitable for conversion into various types of fuels, plastics, dyestuffs, lubricating oils, explosives, medicinals, and other products. The hydrocarbons which form the basis for such products are to be found in nature in a variety of forms including natural gas, oil, coal, and related materials. Certain hydrocarbons are also available as a result of manufacturing processes, for example, those derived from the waste products of refining operations, and other manufacturing processes.

Unfortunately, the molecular form in which such hydrocarbons are available is not always suitable for the uses to which they are to be put, frequently making it necessary to alter their chemical structure.

In the past, a variety of ways have been resorted to in order to accomplish such molecular restructuring. For example, resort has been had to chemical "rearrangements", usually accomplished with the assistance of a catalyst to form new compounds having the same molecular weight, but displaying different properties.

The Fischer-Tropsch process is another way in which restructuring can be carried out. The method includes the synthesis of water gas, accomplished by passing steam over hot coke, followed by its enrichment with hydrogen, and the subsequent reaction of the gas in the presence of a catalyst to provide hydrocarbons ranging from $C_3$ to $C_{35}$, and even higher. A variety of catalysts and operating conditions have been employed for the reaction.

Lignite, coal, various tars, and related materials have also been catalytically hydrogenated to produce fuel oils. In addition, natural gas has been reacted with steam to produce carbon monoxide and hydrogen, such reaction products having then been converted to methyl alcohol by the use of aluminum, copper, and zinc based catalysts. The alcohol has subsequently been employed to make olefins, the latter forming the starting materials for the manufacture of middle distillates.

Acetylene can also be prepared by partially oxidizing natural gas in the presence of oxygen. Furthermore, the cracking of natural gas rich in ethane, propane, or butane at high temperatures, for example, yields a high proportion of ethylene, among other products. In like manner, the thermocracking of aromatic compounds such as naphtha results in the production of higher olefins.

In addition to the preceding, a variety of other reforming systems have been developed, for instance, involving the dehydrogenation of cyclohexanes to form aromatic hydrocarbons, the dehydrocylization of certain paraffins to yield aromatics, and the isomerization of straight-chain to branched-chain molecules. Some of these systems simply rely on heat and pressure for the transformation, while others are accomplished catalytically. Hydrogen is also used in hydroforming operations in the presence of heat, pressure, and catalysts to convert olefinic hydrocarbons to branched-chain paraffins.

While all of the preceding accomplish molecular restructuring of the starting materials, many of the processes suffer from excessive operating costs. Still others require extensive investment in expensive processing equipment. Consequently, many of the processes have been of value chiefly in special circumstances such as during wartime, or in other unusual situations.

BRIEF DISCLOSURE OF THE INVENTION

In view of the preceding, therefore, it is a first aspect of this invention to provide a relatively low-cost process for restructuring the molecular constituents of hydrocarbon substances.

A second aspect of this invention is to provide a method for combining and rearranging the components of gaseous hydrocarbons.

Another aspect of this invention is to provide a method for synthesizing desirable hydrocarbons from natural gas and other materials.

A further aspect of this invention is to furnish a process for restructuring hydrocarbons that can be accomplished in relatively simple processing equipment, and with minimal processing steps.

An additional aspect of this invention is to make available a way in which to promote the molecular restructuring of hydrocarbons at relatively low temperatures and pressures.

Still another aspect of this invention is to provide a way in which higher molecular weight, normally solid or liquid hydrocarbons can be cracked to produce molecularly restructured materials.

Yet a further aspect of this invention is to provide a simplified process for efficiently converting hydrocarbon substances into more useful materials.

A still further aspect of this invention is to produce increased yields of hydrocarbon materials from the non-hydrocarbon dross with which they are associated.

The foregoing and additional aspects of the invention are provided by a process for the chemical restructuring of hydrocarbon compounds comprising their chemical combination to form different compounds characterized by contacting said hydrocarbon compounds with a catalyst comprising a copper salt and anhydrous aluminum chloride, thereby producing said different compounds.

The foregoing and still additional aspects of the invention are provided by a catalyst for dehydrogenating hydrocarbon compounds, thereby producing free radical molecular fragments that combine to provide compounds having structures different from said hydrocarbon compounds, said catalysts comprising anhydrous aluminum chloride, in combination with a copper salt.

The foregoing and other aspects of the invention are provided by a process for cracking hydrocarbons to form restructured hydrocarbon products comprising forming a reaction mixture by combining a heated, hydrocarbon-containing material with a catalyst comprising anhydrous aluminum chloride and a copper salt, and continuing the cracking reaction thus initiated until the restructured hydrocarbon products resulting from the cracking reaction have been formed, vaporized, and substantially removed from the reaction mixture.

DETAILED DESCRIPTION OF THE INVENTION

While not wishing to be bound by speculation as to the mechanism through which the catalyst of the invention, or the processes using the catalyst, accomplish the molecular restructuring of the hydrocarbons with which they are contacted, it is theorized that the catalysts function by promoting the dehydrogenation of the constituent components of the starting raw materials. The free radicals thereby formed are believed to subsequently recombine in the form of oligomers, polymers, and isomers, normal, branched, and cyclyized, as well as other molecular combinations.

While the nature of the catalyst is not fully understood, it is presumed to be some form of organometallic, cupra-aluminum compound formed in situ in the reaction mixture. Apparently, the catalyst facilitates the transformation of the hydrocarbons from their original form, to new forms, by means of an inner shell of electrons capable of shifting to a different energy level. Irrespective of the mechanism, however, the catalyst functions to efficiently transform hydrocarbons from their original structure to new, more desirable structures.

It is also believed that the alumina support may play a significant role in the action of the catalyst, and the use of such a support is, therefore, preferred.

The catalyst can be used to convert relatively low molecular weight hydrocarbons present in gaseous streams, for example, natural gas to higher molecular weight compounds. Alternatively, it can be employed to "crack" more complex hydrocarbons, for instance, those occurring in shale oil rock to hydrocarbon components which then recombine to form different, useful materials.

The catalyst of the invention employs a copper salt such as copper chloride, preferably copper acetate, in combination with anhydrous aluminum chloride.

When the catalyst is employed in connection with gaseous raw materials, the copper salt, and a roughly equal weight of anhydrous aluminum chloride can be deposited on a support material such as alumina, silica, titania, zirconia, or the like. In a preferred embodiment of the invention, refractory alumina is used. The support is normally in the form of small granules, for example, from about 2 to about 4 millimeters in diameter, and the deposited material is coated thereon in any of the well known ways. In theory, a thin film is all that is required for catalytic activity. In the case of the molecular restructuring of gaseous materials, vaporous anhydrous aluminum chloride may also be brought into contact with a copper salt-coated catalyst support during the reaction. In the latter event, since aluminum chloride sublimes at 178° C., it is usually introduced into the reaction chamber at from about 180° C. to 190° C. The amount introduced being that sufficient to assure that on a weight basis approximately one part of anhydrous aluminum chloride will be present for every 10 parts of gaseous feed material in the reaction chamber.

The reaction chamber for gaseous mixtures may take the form of any of the reactor types known to the art, for example, vertical towers containing trays on which the catalyst granules are disposed, or horizontal, tube-like reactors packed with the granules through which the gaseous material passes. Reactors with movable catalyst beds may also be employed.

The gaseous raw materials suitable for use with the catalyst of the invention include such substances as natural gas, refinery waste gases, that is, refinery by-product gases containing such things as hydrogen and, for example, up to about $C_4$ hydrocarbons, biomass decomposition products and the like. The composition of the natural gas will depend upon its origin, but commonly will contain such components as methane, ethane, propane, butane, as well as nitrogen, carbon dioxide, hydrogen sulfide and others. The biomass decomposition gas will consist chiefly of methane, while the nature of the refinery waste gas streams will depend upon the process train of the refinery.

The process of the invention is carried out by passing the gaseous raw material, or such material together with the sublimed anhydrous aluminum chloride into a reactor controlled at from about 200° C. to about 700° C. The pressure of the reaction will ordinarily be adjusted to from about 1 to about 5 atmospheres. While the hydrocarbon raw material stream need not be preheated prior to entering the reactor, it is desirable that it be relatively free from catalyst inactivating substances such as sulfur-containing compounds including hydrogen sulfide, mercaptans, and other similar contaminants. It is also necessary that it be dry. Drying can be accomplished, for example, by treatment with alumina or bauxite, while the sulfur-bearing contaminants can be removed in well known ways including in the case of hydrogen sulfide, treatment with monoethyanolamine.

The contact time of the gaseous hydrocarbon with the catalyst in the reactor will depend upon the conditions of the reaction, including the reaction pressure, e.g., the lower the pressure, the greater the contact time. The temperature of the reaction, the materials which it is desired to produce, and other similar factors will also affect the time of contact. Normally, however, the contact time may be from about one second to about 5 minutes.

The conversion realized will usually be at least about 25% per pass of the hydrocarbon raw material through the reactor, with the unreacted gases being returned to the reactor for further reaction, thus allowing the process to ultimately achieve at least about 50% total conversion.

The reaction appears to take place at the surface of the catalyst support, the point at which the aluminum evidently enters into some type of complex formation with the copper and the organic matter present to form the active reaction foci. The hydrochloric acid released in the process is carried on through the reaction chamber to the purification train, concerning which more will be said later.

Eventually, the available catalyst present on the surface of the catalyst support is exhausted. In addition, carbon accumulates on the surface of the catalyst, both of which events prevent the catalyst from continuing to function properly. At this point, the catalyst must be regenerated, for example, by being heated to remove the carbon contaminates present, and then recoated with catalyst components.

The gas stream exiting the reactor is water scrubbed to remove the hydrochloric acid, and to condense the restructured hydrocarbons. Normally, water scrubbing is carried out in a series of scrubbing towers, the last of which is desirable controlled at a relatively low temperature, for instance, from about 5° C. to 10° C., to condense the lower boiling fractions present. The gases exiting the scrubbing operation are recycled to the reactor as previously described, sometimes as many as about three times. It is of advantage to vent a portion of the recycle gas to eliminate the build-up of non-condensables in the system. If desired, such venting can be in the form of a bleed stream which can be utilized as boiler fuel or for heating.

The hydrocarbons condensed in the scrubbing operation are thereafter separated from the water phase and rectified by distillation or other procedures commonly used for the purpose.

The products produced will depend upon the feed stream introduced to the reactor, as well as the reaction conditions, but will often include such materials as gasoline, naphtha, kerosene, diesel, light lube fractions, olefins, paraffins, and the like, and will include, for example, $C_8$ to $C_{13}$ components.

As previously indicated, the catalyst of the invention may also be used in connection with the molecular restructuring of liquid hydrocarbons including such things as pitches, tars, asphaltic materials, stillbottoms, tar sands, oil shales, paraffin waxes, and like materials.

Such materials have previously presented difficulties to the petroleum industry. For instance, liquid fractions have in the past been cracked to provide more useful fractions. However, the products thus obtained have required solvent extraction with materials such as methyl ethyl ketone to remove the wax portions, which have then been sold separately from the oil portion.

In the case of oil shale, an organic substance called kerogen containing from about 5 to 30% by weight oil and found in Scotland, Australia, Russia and the United States, the rock is powdered and heated in vertical retorts at a temperature from about 480° C. to 700° C. When thereafter treated with steam, such rock yields about 28 gallons of oil per ton of rock, the rest being carbonaceous residue.

Tar sands, oil-containing sand or clay found in Canada, Iran and the United States, and containing about 13 pounds per cubic foot of oil per cubic foot of sand, are extracted with hot water and steam. The process has been hampered, however, by pollution problems associated with the water employed for the extraction. This has particularly been a problem in the arid regions where the tar sands are ordinarily to be found.

The catalyst of the invention obviates these problems, however, while more than doubling the recoverable hydrocarbon yield, and at the same time improving the quality of the recovered material. Furthermore, the process of the invention eliminates the need for the considerable volumes of water required for the water extraction of the tar sands involved in the prior recovery method.

In the case of treatment with the catalysts of the invention, and with respect to the cracking of liquid or meltable hydrocarbon materials, the materials are heated in a stirred retort, and the catalyst is added to the liquid material.

The amount of the anhydrous aluminum chloride portion of the catalyst represents about 5 to 10%, by weight, of the estimated hydrocarbon content of the material subjected to the cracking process, while the copper salt is adjusted to constitute about 5 to 10% of the anhydrous aluminum chloride present. The catalyst components are typically added as a dry powder.

Following addition of the catalyst materials to the retort, agitation and heating of the reaction mixture is continued to about 370° C., at which point the cracking of the components has been substantially completed, and the hydrocarbon components desired formed and eliminated as vapors from the vessel. The products thus obtained are water scrubbed, for example, in a series of scrubbing towers as previously described, to remove the hydrochloric acid formed during the reaction, and for the purpose of condensing the reaction products. As in the case of the conversion of gaseous products, the last of the scrubbing towers is often operated at a reduced temperature, preferably in the order of 5° C. to 10° C., to complete condensation of the lower boiling hydrocarbon fractions.

In the case of the shale oil rock, the rock is powdered and mixed with catalyst in the relative amounts described in the preceding in connection with the processing of meltable solids and liquids, and thereafter reacted in an apparatus such as, for instance, a rotary kiln operated at about 500° C. The hydrocarbon products formed leave the kiln drum in the form of vapors, after which they are processed in scrubbing towers as has been previously described.

In the case of tar sands, the sands are mixed with catalyst in the form and amount described in connection with the processing of shale rock and meltable and liquid hydrocarbons, in a stirred retort heated to about 370° C. The hydrocarbons formed leave the retort in the form of vapors, which again are scrubbed in the manner detailed in the foregoing.

In the case of all the preceding, the hydrocarbons separated from the scrubbing tower water are fractionated or otherwise processed to obtain separation of the different hydrocarbons produced during the cracking process.

In view of the fact that the reactions involving the meltable solids and liquids and the solid hydrocarbon-containing raw materials described are batch processes, the reaction time is relatively long, i.e., in the order of one-half hour or longer, due to the fact that appreciable time is required to heat the reaction mixture contents, and since the vaporous hydrocarbons formed in the course of the cracking reaction require time to be released from the carbonaceous residue.

The products formed include, for instance, such products as gasoline, diesel, kerosene, light lube products and others.

The following examples while not intended to be limiting in nature are illustrative of the invention. The examples detail the reaction conditions and products produced by the use of procedures according to the preceding descriptions.

TABLE 1

| Example No. | Raw Material Feed | Temp. (°C.) | Pressure (atmospheres) | Reaction Products |
|---|---|---|---|---|
| 1 | Liquified petroleum gases, $C_3$, $C_4$, etc. | 200–500 | 1 | gasoline, kerosene, diesel, light lube, etc. |
| 2 | Natural Gas, | 200–600 | 1 | kerosene, |

TABLE 1-continued

| Example No. | Raw Material Feed | Temp. (°C.) | Pressure (atmospheres) | Reaction Products |
|---|---|---|---|---|
| | $C_4$ and higher paraffins | | | diesel, light lube (more gasoline is formed than in example 1), etc. |
| 3 | Refinery waste gas (olefins, paraffins, $H_2$, etc.) | 200–700 | 1 | gasoline, kerosene diesel, light lube, etc. |
| 4 | Paraffin wax | melt point (370) | 1 | gasoline, kerosene, diesel, light lube, carbonaceous residue, etc. |
| 5 | Oil shale rock powder | 200–500 | 1 | gasoline, kerosene, light lube, carbonaceous residue, etc. |
| 6 | Tar containing material | melt point (370) | 1 | gasoline, kerosene, light lube, carbonaceous residue, etc. |

In the case of the vapor stream leaving the oil shale rock reaction mixture, the water scrubbing also serves to remove ammonium salts resulting from the ammonium compounds naturally present in the rock.

The importance of employing the catalysts of the invention with solid hydrocarbon-bearing materials is evident from the fact that the oil reserves potentially available from oil shale are estimated to amount to 22 billion tons, twice the known reserves of liquid petroleum in the world. In the case of tar sands, it is estimated that such deposits amount to the equivalent of at least about 50 billion tons of oil.

While in accordance with the patent statutes, a preferred embodiment and best mode has been presented, the scope of the invention is not limited thereto, but rather is measured by the scope of the attached claims.

What is claimed is:

1. A process for the chemical restructuring of substantially gaseous hydrocarbon feed stream materials consisting of compounds of hydrogen and carbon containing one to four carbon atoms to form chemically restructured hydrocarbon products having a greater molecular weight than said feed stream materials characterized by contacting said hydrocarbon feed stream materials with a catalyst support impregnated with a catalyst comprising a copper salt in the presence of anhydrous aluminum chloride, thereby producing chemically restructured hydrocarbon products of greater molecular weight than said feed stream materials.

2. A process according to claim 1 in which said anhydrous aluminum chloride is present in vaporous form.

3. A process according to claim 1 in which said contact takes place while said hydrocarbons are in heated, gaseous form, and under pressure of at least one atmosphere.

4. A process according to claim 3 in which said copper salt is a member selected from the group of copper acetate and copper chloride.

5. A process according to claim 4 in which said catalyst support is aluminum oxide and consists of granules of refractory alumina, while said copper salt is copper acetate, and in which said hydrocarbons have been heated to from about 200° C. to about 700° C., and said pressure is maintained at from about 1 atmosphere to about 5 atmospheres.

6. A process according to claim 3 in which said hydrocarbons are selected from the group of natural gas, refinery waste gas, and biomass decomposition gas.

7. A process according to claim 1 wherein said substantially gaseous hydrocarbon feed stream materials are selected from members of the group consisting of natural gas, gas produced during petroleum refining operations, biomass decomposition gas and mixtures thereof, said members containing one to four carbon atoms, and said chemically restructured hydrocarbon products comprise polymerized compounds containing at least eight carbon atoms.

8. A process for cracking hydrocarbons to form restructured hydrocarbon products comprising forming a substantially liquid reaction mixture by combining a heated, hydrocarbon-containing feed stream material with a catalyst comprising anhydrous aluminum chloride and a copper salt, and cracking the feed stream material to form cracked product containing polymerizable components which are subsequently polymerized to form a polymerized product wherein said polymerized product is separated from said cracked product until the cracking polymerized.

9. A process according to claim 8 in which the copper salt is copper acetate, and in which said anhydrous aluminum chloride constitutes at least about 5%, by weight, of said hydrocarbons contained in said reaction mixture, and said copper salt constitutes about 10% by weight of said aluminum chloride.

10. A process according to claim 8 in which the temperature of the reaction mixture is controlled within a temperature range of about 370° C. to about 500° C.

* * * * *

UNITED STATES PATENT AND TRADEMARK OFFICE
CERTIFICATE OF CORRECTION

PATENT NO. : 5,012,025

DATED : April 30, 1991

INVENTOR(S) : Viswanatha Sankaran

It is certified that error appears in the above-identified patent and that said Letters Patent is hereby corrected as shown below:

Column 8, line 53, please insert a period (.) at the end of the line.

Column 8, line 54, delete the entire line "until the cracking polymerized."

Signed and Sealed this

Fifteenth Day of December, 1992

Attest:

DOUGLAS B. COMER

*Attesting Officer*  *Acting Commissioner of Patents and Trademarks*